US010349193B2

(12) United States Patent
Schurter et al.

(10) Patent No.: US 10,349,193 B2
(45) Date of Patent: Jul. 9, 2019

(54) INTERFACE DEVICE, A CELLULAR PHONE PROTECTION SHELL AND AN ARRANGEMENT THEREOF

(71) Applicant: Sonova AG, Stafa (CH)

(72) Inventors: Paul Javier Schurter, Hirzel (CH); Michael Eckardt, Stafa (CH)

(73) Assignee: SONOVA AG, Stäfa (CH)

( * ) Notice: Subject to any disclaimer, the term of this patent is extended or adjusted under 35 U.S.C. 154(b) by 0 days.

(21) Appl. No.: 15/313,618

(22) PCT Filed: May 30, 2014

(86) PCT No.: PCT/EP2014/061279
§ 371 (c)(1),
(2) Date: Nov. 23, 2016

(87) PCT Pub. No.: WO2015/180797
PCT Pub. Date: Dec. 3, 2015

(65) Prior Publication Data
US 2017/0201838 A1    Jul. 13, 2017

(51) Int. Cl.
*H04M 1/725* (2006.01)
*H04R 25/00* (2006.01)
*H04W 4/80* (2018.01)
*H04B 1/3888* (2015.01)
*H04M 1/18* (2006.01)

(52) U.S. Cl.
CPC ......... *H04R 25/554* (2013.01); *H04B 1/3888* (2013.01); *H04M 1/7253* (2013.01); *H04M 1/72591* (2013.01); *H04R 25/453* (2013.01); *H04W 4/80* (2018.02); *H04M 1/185* (2013.01); *H04M 2250/02* (2013.01); *H04R 2225/61* (2013.01); *H04R 2460/03* (2013.01)

(58) Field of Classification Search
CPC ........ H01R 25/00; H01R 33/88; H01R 33/94; H01R 31/06; H01R 24/54; H04M 1/72591; H04W 4/008
USPC .......................... 381/370, 374, 376, 333, 311
See application file for complete search history.

(56) References Cited

U.S. PATENT DOCUMENTS

| 5,818,701 | A | * | 10/1998 | Shindo | ................. | H04B 1/3833 |
| | | | | | | 361/814 |
| 5,982,904 | A | * | 11/1999 | Eghtesadi | ........... | H04R 1/1091 |
| | | | | | | 381/311 |
| 7,329,153 | B2 | * | 2/2008 | Lin | ...................... | H04R 1/1033 |
| | | | | | | 439/660 |

(Continued)

FOREIGN PATENT DOCUMENTS

| EP | 1 271 899 A1 | 1/2003 |
| EP | 1 981 176 A1 | 10/2008 |
| WO | 2008/071807 A2 | 6/2008 |

OTHER PUBLICATIONS

International Search Report for PCT/EP2014/061279 dated Jan. 29, 2015.
Written Opinion for PCT/EP2014/061279 dated Jan. 29, 2015.

*Primary Examiner* — Sunita Joshi
(74) *Attorney, Agent, or Firm* — Pearne & Gordon LLP

(57) ABSTRACT

An interface device (12) is provided, adapted to wirelessly couple at least one hearing device to a cellular phone (10), wherein the interface device (12) is adapted to be mechanically coupled to the cellular phone (10) by means a cellular phone protection shell (14).

20 Claims, 1 Drawing Sheet

(56) References Cited

U.S. PATENT DOCUMENTS

| | | | |
|---|---|---|---|
| 7,803,016 B2* | 9/2010 | Neu | H04R 5/00 |
| | | | 439/527 |
| 2004/0240692 A1 | 12/2004 | Julstrom | |
| 2006/0018498 A1 | 1/2006 | Hulskemper | |
| 2007/0141898 A1* | 6/2007 | Mayette | H01R 13/6315 |
| | | | 439/502 |
| 2007/0291973 A1* | 12/2007 | Neu | H04R 5/00 |
| | | | 381/334 |
| 2014/0321682 A1* | 10/2014 | Kofod-Hansen | H04R 25/305 |
| | | | 381/315 |

* cited by examiner

INTERFACE DEVICE, A CELLULAR PHONE PROTECTION SHELL AND AN ARRANGEMENT THEREOF

TECHNICAL FIELD OF THE INVENTION

The present invention relates to an interface device, a cellular phone protection shell and an arrangement comprising the interface device and the cellular phone protection shell.

BACKGROUND OF THE INVENTION

Hearing devices are typically small ear-level devices used to improve the hearing capability of hearing impaired individual. This is achieved by picking up the surrounding sound with a microphone of a hearing device, processing the microphone signal thereby taking into account the hearing impairment of the individual and providing the processed sound signal into an ear canal of the individual via a miniature loudspeaker.

During a telephone conversation, hearing device capability can be degraded due to unwanted acoustic feedback.

Document WO 2008/071807 A2 proposes a communication system comprising a telephone handset and at least one hearing device comprising means capable of wirelessly transmitting audio signals between the telephone handset and the hearing device via an audio signal communication. However, regarding this audio signal communication, there is a problem in that each of a variety of hearing devices must be compatible to each of a variety of different telephone handsets and vice versa. To overcome this problem, the telephone handset might be provided with a plurality of different audio signal communication means compatible with respective audio signal communication means of different hearing device manufacturers, respectively. However, this solution is expensive and requires much telephone handset space. Another problem is the high consumption of battery power required to establish the audio signal communication.

It is an object of the present invention to provide an interface device, a cellular phone protection shell and an arrangement alleviating telephone conversation problems in association with at least one hearing device.

SUMMARY OF THE INVENTION

This object is solved by an interface device according to independent claim 1 of the present invention. Specifically, the present invention provides an interface device, adapted to wirelessly couple at least one hearing device to a cellular phone, wherein the interface device is adapted to be mechanically coupled to the cellular phone by means of a cellular phone protection shell.

The interface device according to the present invention is capable to provide audio signal communication between a cellular phone and at least one hearing device. The proposed mechanically coupling between the interface device and the cellular phone by means of the cellular phone protection shell provides minimal distance between the interface device and the cellular phone. This minimal distance provides minimal power consumption, which in turn provides increased battery life time.

The present invention further eludes mismatch due to different communication standards, i.e. due to incompatibility between the interface device and the cellular phone. Further, due to the fixed coupling, the interface device cannot get lost, for example in the course of a relocation. Furthermore, since the interface device is mechanically coupled to the cellular phone, no "separate" device must be handled. Advantageously, the invention appears as a single entity for the handling. In other words, no neckloop, clipping, etc. is required.

In an embodiment, the interface device is adapted to be received into a recess formed in the cellular phone protection shell, wherein the shape of the recess is formed such as to conform to the contour of at least one of surfaces of the interface device, wherein one of surfaces of the interface device, when received into the recess, is flush with non-recessed portions of the cellular phone protection shell. This conformity between the shape of the recess and the contour of the interface device provides snuggly fitting of the interface device resting against the rear face of the cellular phone when the cellular phone is fixedly received into the cellular phone protection shell. Hence, the interface device is properly fixed between the cellular phone and the cellular phone protection shell which prevents damages to the interface device. Due to the fact, that the interface device is completely protected by a protective surrounding, the size strength of the housing of the interface device can be reduced. This reduces space and costs.

In a further embodiment, the interface device is adapted to be wirelessly connected to the cellular phone via a bluetooth connection. This solution eliminates problems, for example mismatches caused by a variety of different communication protocols. By using the bluetooth connection, the interface device communication protocol conforms to the cellular phone communication protocol, and vice versa, since the communication protocol used is a common, widely spread standard communication protocol established in the cellular phone market. Hence, the interface device is compatible to each and every cellular phone from all brands offering bluetooth communication. This costumer friendly solution provides increased market acceptance and reduced costs.

In a further embodiment, the interface device is adapted to be wirelessly connected to the hearing device via a proprietary wireless signal connection. This allows the manufacturer of the hearing device to choose an audio signal communication matching with manufacturer's demands in view of selected and/or predefined radio coverage, power consumption, transmission quality, receiver/transmitter size, etc.

In a further embodiment, the interface device comprises a remote microphone for receiving speech. This allows the interface device to convert the individual's speech into a digital audio signal which is transmitted from the interface device to the cellular phone via the bluetooth connection, for example. In this aspect, the bluetooth connection provides a bidirectional radio link between the interface device and the cellular phone.

The object addressed above is also solved by a cellular phone protection shell according to independent claim 6 of the present invention. Specifically, the present invention provides a cellular phone protection shell comprising a recess formed to receive the interface device according to one of claims 1 to 5.

In an embodiment, the shape of the recess is formed such as to conform to the contour of at least one of surfaces of the interface device, wherein one of surfaces of the interface device, when received into the recess, is flush with non-recessed portions of the cellular phone protection shell. Thus, the protection shell is provided with a recess formed such as to conform to the contour of the interface device.

Further, by fitting the protection shell to the rear face of a cellular phone, for example by means of a snap-on fitting, the interface device is snuggly embedded into the arrangement formed by the cellular phone and the cellular phone protection shell.

In a further embodiment, the cellular phone protection shell is made of an elastomer. The protection shell made of an elastomer allows for flexibility. This flexibility provides protection in case of the arrangement comprised by the cellular phone and the protection shell drops out of the hand of the user and falls towards the floor. Additionally, this protection shell is able to receive the interface device, snuggly fitted into the recess formed into the protection shell.

In an embodiment, the cellular phone protection shell is adapted to be snapped-on along portions of at least a periphery of the cellular phone. This snap-on connection can be achieved easily. Further, additional connecting means or rather supporting means can be omitted. Therefore, costs can be reduced.

In a further embodiment, the cellular phone protection shell comprises apertures positioned such as to allow access to input/output-devices of the interface device. Due to the apertures, the user can switch on or switch off the interface device and/or features of the interface device easily. The interface device can be provided with several buttons accessible by means of the apertures. By operating the buttons, the user is allowed to adjust the loudness, to switch on or off the bluetooth-connection, etc., for example.

The object addressed above is also solved by an arrangement according to independent claim 11 of the present invention. This arrangement comprises an interface device according to one of claims 1 to 5 and a cellular phone protection shell according to one of claims 6 to 10.

In an embodiment, the cellular phone protection shell is formed to receive the interface device such as to be sandwiched between the cellular phone and the cellular phone protection shell. This arrangement offers the most practical way of carrying the interface device with the cellular phone.

In a further embodiment, the interface device is received into the recess such as to protrude from a portion of the periphery of the cellular phone.

In a further embodiment, the interface device comprises a microphone arranged in a portion of the interface device protruding from the periphery of the cellular phone, wherein the microphone is exposed to the outside via at least one microphone opening. This aspect allows that the microphone opening formed into the interface device can be directed towards the front face of the cellular phone. For best reception of speech, this microphone opening can be located in the vicinity of the user's mouth, similar to the microphone opening location of common cellular phones.

BRIEF DESCRIPTION OF THE DRAWINGS

The present invention is further described with reference to the accompanying drawings jointly illustrating various exemplary embodiments which are to be considered in connection with the following detailed description. What is shown is the following.

DETAILED DESCRIPTION OF THE INVENTION

Figures 1A, 1B:
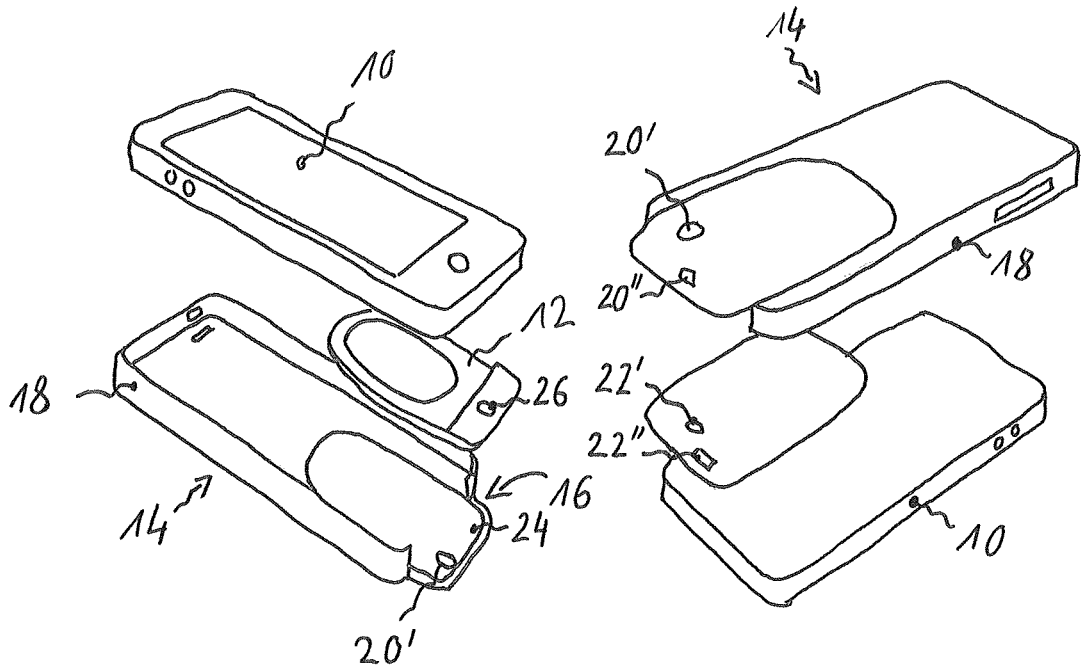
FIG. 1a an exploded view depicting an assembly comprising a cellular phone and an arrangement according to the present invention.
FIG. 1b the exploded view depicted in FIG. 1a in an upside down direction.

FIG. 1a shows an exploded view depicting an assembly comprising a cellular phone 10 and the arrangement according to the present invention. Specifically, the assembly comprises the cellular phone 10 and the arrangement composed of an interface device 12 and a cellular phone protection shell 14.

The cellular phone protection shell 14 comprises a recess 16 formed to receive the interface device 12. Therefore, the recess 16 is formed such as to conform to the contour of the rounded rear face of the interface device 12. The surface of the interface device 12 opposed to the surface received into the recess 16 of the cellular phone protection shell 14 is flush with non-recessed portions of the cellular phone protection shell 14. Thus, when the interface device 12 is received into the recess 16, the surface of the cellular phone protection shell 14 receiving the rear face of the cellular phone 10 is continuous.

Advantageously, as the cellular phone protection shell 14 fits specific cellular phone models, the cellular phone 10 performance is not negatively influenced by wrongly mounting the interface device 12. Due to the closest proximity of the interface device 12 to the cellular phone 10, the power management of both the interface device 12 and the cellular phone 10 can be optimized resulting in maximum battery lifetime.

The cellular phone protection shell 14 has the outer shape of a normal protection shell like any shell from the market. This ensures proper integration of the interface device 12 for many different shapes of cellular phones 10. Hence, proper usage of the interface device 12 is ensured, eliminating additional problems like falling off, getting stuck when entering into a pocket, etc.

The cellular phone 10 can be fixed to the cellular phone protection shell 14 by simply pushing the cellular phone 10 against an elastic rim 18 surrounding the periphery of the cellular phone protection shell 14. This rim 18, due to its elasticity, allows to hook the cellular phone 10 into the cellular phone protection shell 14. In other words, the rim 18 is snapped-on along portions of the periphery of the cellular phone 10. In this state, the interface device 12 is fixedly received by being sandwiched between the cellular phone 10 and the cellular phone protection shell 14.

As best seen in FIG. 1b, the cellular phone protection shell 14 comprises apertures 20', 20" positioned such as to allow access to input/output-devices 22', 22" of the interface device 12. At least one of the input/output-devices 22',22" can be embodied as a button used to be operated in order to at least switch on/off operation of the interface device 12. Further, at least one button can be provided used to be operated in order to accept an incoming call. Additionally, at least one button can be provided used to be operated in order to perform a bluetooth-connection pairing with the cellular phone 10. Additionally or as an option, a light emitting diode (LED) for indication a status indication of the interface device 12 can be provided. Summarized, the input/output-devices 22', 22" allow a general user interaction to the interface device 12.

The cellular phone protection shell 14 comprises a protrusion 24 allowing the interface device 12 to be received into the recess 16 such as to protrude from a portion of the periphery of the cellular phone 10. The interface device 12 further comprises a microphone opening 26 penetrating the housing of the interface device 12 such to allow access to a microphone (not shown) comprised into the interface device 12. Therefore, the microphone is easily exposed to the outside via this microphone opening 26. The microphone opening 26 is arranged in a portion of the interface device 12 which portion protrudes from the periphery of the cellular phone 10. Further, the microphone opening 26 is positioned such to be directed to the front face of the cellular phone 10. This arrangement allows optimized reception of individual's speech by the microphone of the interface device 12.

Figure 2:
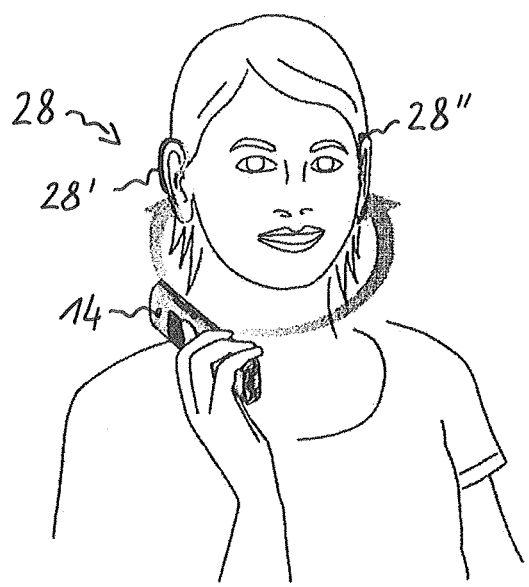
FIG. 2 a usage of the assembly shown in FIGS. 1a,b.

FIG. 2 shows a usage of the assembly in association with a hearing device system 28 comprising two hearing devices 28', 28". The assembly comprises the cellular phone protection shell 14 receiving the cellular phone and the interface device sandwiched between the cellular phone and the cellular phone protection shell (refer to FIGS. 1a,b). The hearing devices 28', 28" are worn adjacent to an individual's ear with the object to improve individual's acoustical perception. In the example shown in FIG. 2, the hearing devices 28', 28" and the interface device are provided with proprietary wireless signal connection means, respectively, adapted to perform radio communication with each other as indicated in the FIG. 2 by arrows. The interface device and the cellular phone are provided with bluetooth connection means, respectively, adapted to perform bluetooth communication with each other. Hence, the interface device acts to couple the hearing devices 28', 28" and the cellular phone. It is to be noted, that the interface device may be still used in association with additional devices, such as large tablets, even if a cellular phone protection shell 14 is not available. This modularity ensures maximum degree of freedom.

What is claimed is:

1. An arrangement comprising:
an interface device (12), adapted to wirelessly couple at least one hearing device (28', 28") to a cellular phone (10), and
a cellular phone protection shell (14) that is separate from the cellular phone (10) and interface device (12),
wherein the interface device (12) is adapted to be mechanically coupled to the cellular phone (10) by means of the cellular phone protection shell (14),
wherein the cellular phone protection shell (14) comprises a recess (16) formed to receive the interface device (12),
wherein the interface device (12) is received into the recess (16) such as to protrude from a portion of a periphery of the cellular phone (10), and
wherein the interface device (12) comprises a microphone arranged in a portion of the interface device (12) protruding from the periphery of the cellular phone (10), wherein the microphone is exposed to the outside via at least one microphone opening (26).

2. The arrangement according to claim 1, wherein the shape of the recess (16) is formed such as to conform to the contour of at least one of surfaces of the interface device (12), wherein one of surfaces of the interface device (12), when received into the recess (16), is flush with non-recessed portions of the cellular phone protection shell (14).

3. The arrangement according to claim 1, wherein the interface device (12) is adapted to be wirelessly connected to the cellular phone (10) via a bluetooth connection.

4. The arrangement according to claim 1, wherein the interface device (12) is adapted to be wirelessly connected to the at least one hearing device (28', 28") via a proprietary wireless signal connection.

5. The arrangement according to claim 1, wherein the cellular phone protection shell (14) is made of an elastomer.

6. The arrangement according to claim 1, wherein the cellular phone protection shell (14) is adapted to be snapped-on along portions of at least a periphery of the cellular phone (10).

7. The arrangement according to claim 1, wherein the cellular phone protection shell (14) comprises apertures (20', 20") positioned such as to allow access to input/output devices (22', 22") of the interface device (12).

8. The arrangement according to claim 1, wherein the cellular phone protection shell (14) is formed to receive the interface device (12) such as to be sandwiched between the cellular phone (10) and the cellular phone protection shell (14).

9. The arrangement according to claim 1, wherein the interface device (12) is separate from and adapted to be wirelessly coupled to both the cellular phone (10) and the at least one hearing device (28', 28").

10. The arrangement according to claim 9, wherein the interface device (12) is adapted to be removably attached to the cellular phone (10) by removably attaching the cellular phone protection shell (14) to the cellular phone (10) such that the interface device (12) is sandwiched between an outer casing of the cellular phone (10) and the cellular phone protection shell (14).

11. The arrangement according to claim 10, wherein the interface device (12) is sandwiched between the outer casing of the cellular phone (10) and the cellular phone protection shell (14).

12. An arrangement comprising:
an interface device (12), adapted to wirelessly couple at least one hearing device (28', 28") to a cellular phone (10),
a cellular phone protection shell (14) that is separate from the cellular phone (10) and interface device (12),
wherein the interface device (12) is adapted to be mechanically coupled to the cellular phone (10) by means of the cellular phone protection shell (14),
wherein the cellular phone protection shell (14) comprises a recess (16) formed to receive the interface device (12),
wherein the cellular phone protection shell (14) includes a back portion and an elastic rim extending at least partially around a perimeter of the back portion that is adapted to be snapped onto the cellular phone (10) such that the interface device (12) is sandwiched between an outer casing of the cellular phone (10) and the cellular phone protection shell (14).

13. The arrangement according to claim 12, wherein the shape of the recess (16) is formed such as to conform to the contour of at least one of surfaces of the interface device (12), wherein one of surfaces of the interface device (12), when received into the recess (16), is flush with non-recessed portions of the cellular phone protection shell (14).

14. The arrangement according to claim 12, wherein the interface device (12) is adapted to be wirelessly connected to the cellular phone (10) via a bluetooth connection.

15. The arrangement according to claim 12, wherein the interface device (12) comprises a remote microphone for receiving speech.

16. The arrangement according to claim 12, wherein the cellular phone protection shell (14) is made of an elastomer.

17. The arrangement according to claim 12, wherein the cellular phone protection shell (14) comprises apertures (20', 20") positioned such as to allow access to input/output devices (22', 22") of the interface device (12).

18. The arrangement according to claim 12, wherein the interface device (12) is separate from and adapted to be wirelessly coupled to both the cellular phone (10) and the at least one hearing device (28', 28").

19. The arrangement according to claim 12, further comprising the at least one hearing device (28', 28") and the cellular phone (10).

20. The arrangement according to claim 1, further comprising the at least one hearing device (28', 28") and the cellular phone (10).

* * * * *